United States Patent
Hodges et al.

(10) Patent No.: US 9,473,631 B2
(45) Date of Patent: Oct. 18, 2016

(54) OUTWARD CALLING METHOD FOR PUBLIC TELEPHONE NETWORKS

(71) Applicants: Christopher J. M. Hodges, Atlanta, GA (US); Susan R. W. Hodges, Atlanta, GA (US)

(72) Inventors: Christopher J. M. Hodges, Atlanta, GA (US); Susan R. W. Hodges, Atlanta, GA (US)

(73) Assignee: nVideon, Inc., Atlanta, GA (US)

( * ) Notice: Subject to any disclaimer, the term of this patent is extended or adjusted under 35 U.S.C. 154(b) by 278 days.

(21) Appl. No.: 13/752,504

(22) Filed: Jan. 29, 2013

(65) Prior Publication Data
US 2014/0211930 A1    Jul. 31, 2014

(51) Int. Cl.
*H04M 3/42* (2006.01)
*H04M 3/44* (2006.01)
*H04M 1/2745* (2006.01)

(52) U.S. Cl.
CPC ......... *H04M 3/44* (2013.01); *H04M 1/274558* (2013.01)

(58) Field of Classification Search
CPC ................... H04M 3/44; H04M 1/274558
USPC ......................................... 379/201.1, 216.01
See application file for complete search history.

(56) References Cited

U.S. PATENT DOCUMENTS

| | | | |
|---|---|---|---|
| 5,561,705 A * | 10/1996 | Allard et al. ................. 455/564 |
| 5,991,364 A * | 11/1999 | McAllister et al. ....... 379/88.01 |
| 6,785,366 B1 * | 8/2004 | Nobuta et al. ............ 379/88.03 |
| 6,963,633 B1 * | 11/2005 | Diede et al. ............... 379/88.03 |
| 7,801,284 B1 * | 9/2010 | Chakra et al. ............. 379/88.03 |
| 8,000,453 B2 * | 8/2011 | Cooper et al. ............ 379/88.03 |
| 8,150,017 B2 * | 4/2012 | Gharachorloo et al. . 379/216.01 |
| 2001/0043694 A1 * | 11/2001 | Chartrand ................ 379/211.02 |
| 2002/0097845 A1 * | 7/2002 | Mahoney ................... 379/88.03 |
| 2004/0052355 A1 * | 3/2004 | Awada et al. ............ 379/355.01 |
| 2004/0198244 A1 * | 10/2004 | Jarrad et al. ................. 455/90.1 |
| 2004/0210439 A1 * | 10/2004 | Schrocter ..................... 704/260 |
| 2005/0135573 A1 * | 6/2005 | Harwood et al. .......... 379/88.03 |
| 2008/0267364 A1 * | 10/2008 | Janke et al. ............... 379/88.03 |

OTHER PUBLICATIONS

Altigen Communications, Extension User Guide, Dec. 2009, pp. 3-20.*

* cited by examiner

*Primary Examiner* — Nafiz E Hoque
(74) *Attorney, Agent, or Firm* — Mehrman Law Office; Michael J. Mehrman

(57) ABSTRACT

A call management device is connected between a standard push button telephone, rotary dial telephone, or other communication device and a public telephone network, and it operates to place (dial) calls on the public telephone network. The call management device maintains a telephone book that can be used to look up a phone number by name. A caller, using their telephone's keypad or rotary dial, can either dial a phone number in the normal fashion or they can dial-by-name from the telephone book.

20 Claims, 8 Drawing Sheets

COMMUNICATION NETWORK 100

COMMUNICATION NETWORK 100

FIG. 3 CALL MANAGEMENT MODULE 220
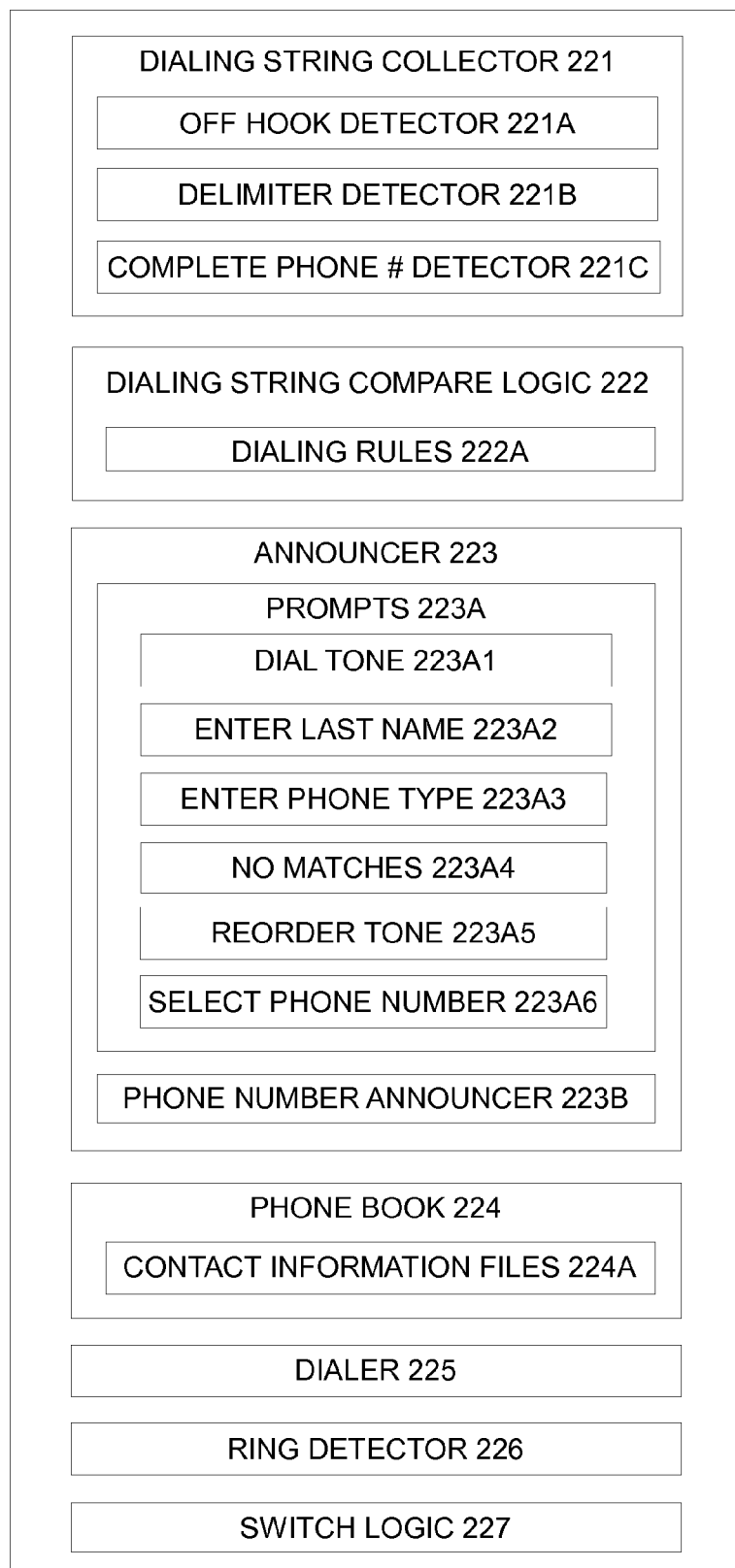

PHONE BOOK FILE FORMAT 300

CONTACT INFORMATION FILE FORMAT 400

US 9,473,631 B2

OUTWARD CALLING METHOD FOR PUBLIC TELEPHONE NETWORKS

FIELD OF THE INVENTION

The present disclosure relates generally to placing a call from a private telephone system to a public telephone network, and specifically to a dial-by-name method of placing the call.

BACKGROUND ART

Ever since low cost microprocessors became available, telephone equipment manufacturers have used them to devise mechanisms such as speed dialing and electronic phone books to make dialing easier and more convenient for a caller. Speed dialing is typically implemented using a specialized button or buttons separate from the traditional telephone keypad. Electronic phone books are typically implemented using specialized buttons and a display. These proprietary interfaces do not allow the speed dial or phone book functionality on one phone to operate with a standard push button or rotary dial telephone or with another manufacturer's telephone even if it has special keys and displays for that purpose. When a consumer purchases a new telephone, they have to learn a new mechanism for speed dialing and/or phone book dialing and these features do not operate with their old telephone.

Private Branch Exchanges (PBX) typically include a mechanism referred to as dial-by-name that simplifies connecting inward callers to a desired extension or for connecting a caller who is local to the PBX with a called party who is also local to the PBX. Often the caller knows the name of the person they wish to be connected with, but not their extension number. In order to expedite completing the call, the PBX can prompt the caller to press a key such as the '#' key on their telephone keypad that signals the PBX to transition from a dial by extension mode to a dial-by-name mode of operation. Once in the dial-by-name mode, the caller is prompted to enter the name of the person they wish to speak with using the letters associated with the standard digit keys 2 though 9 on their telephone's keypad until a unique match is found, at which time the PBX system dials the appropriate extension for the caller.

BRIEF DESCRIPTION OF THE DRAWINGS

The present invention can be best understood by reading the specification with reference to the following figures, in which:

FIG. 3 is a diagram of a call management module 220.

DETAILED DESCRIPTION

Cross Reference to Related Applications

Figure 1:
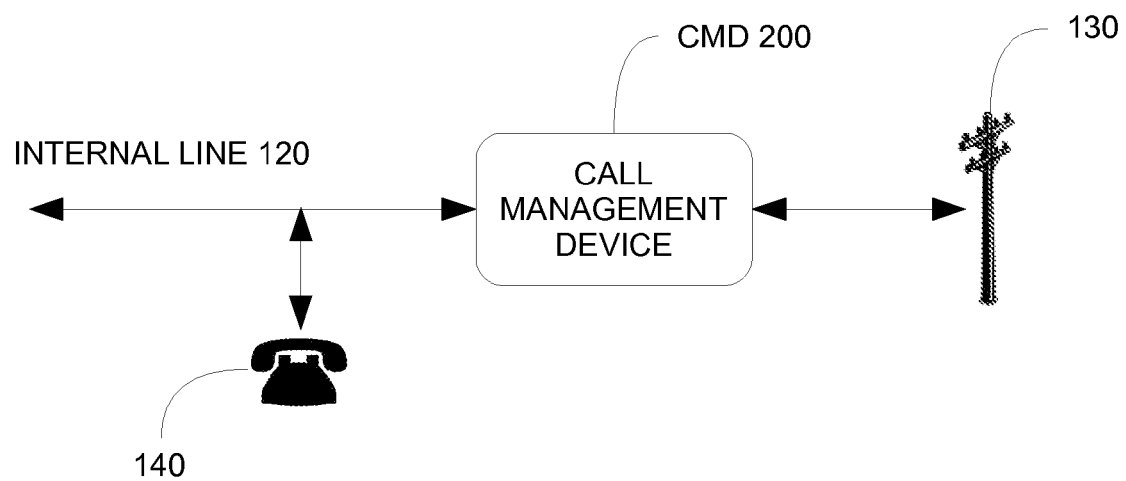
FIG. 1 is a diagram of a communication network 100.

This application claims the benefit under 35 U.S.C. 120 of U.S. patent application Ser. No. 13/739,225, entitled "Outward Calling Method for Public Telephone Networks", filed Jan. 11, 2013, the entire contents of which are incorporated herein by reference.

While home based telephone systems can be purchased that allow a user to look up a contact's phone number in an electronic phone book and then automatically dial that phone number on the public telephone network, the electronic phone book is often cumbersome and unintuitive to use and does not allow for a truly universal dial-by-name functionality that can be used by any standard telephone. Any system that provides a truly universal dial-by-name functionality requires a device for that purpose to be placed between the telephones and the public telephone network. And while PBXes could serve as that device and their inward dial-by-name functionality could be adapted in a limited way to outward dialing, they have certain drawbacks. Home users would be very resistant to the expense and the complicated installation and maintenance that they require, and the dial-by-name functionality provided by these PBXes is somewhat cumbersome to use. Additionally, the PBX's dial-by-name functionality does not address the selection of a home phone number, a mobile phone number, a work phone number, or other type of phone for a given contact.

Another issue with providing a device to implement a universal dial-by-name function is the complication of installing this device between the traditional land line service and the telephones. However, recently, it has become common for home owners to replace their traditional land line service with a voice over IP (VOIP) or wireless service. This requires that the VOIP or wireless service install a device between the telephones and the VOIP or wireless service eliminating the need for the user to install the device. This device provides an ideal platform for a truly universal outward calling dial-by-name function, either as part of the device or when placed between the device and the telephones.

Therefore, it is desirable that an outward calling process provide an intuitive dial-by-name functionality that does not change the traditional dial-by-phone number process, does not require the caller to remember to take any special action prior to dialing, and can be completed using only a standard telephone's 12 button keypad (or rotary dial), switch hook, and handset. Further, it is desirable that the outward calling dial-by-name functionality operates to enable the selection of a called party's phone number type such as their home phone number, work phone number, mobile phone number, fax phone number, or other type of phone number. This novel dial-by-name (DBN) functionality can be implemented in a call management device, positioned between a telephone and a public telephone network, that operates to intercept information associated with an outward call dialing process, before the information is transmitted over a public telephone network, to initiate the DBN call process.

In one embodiment of the invention, a caller, using the letters associated with the digit keys on a telephone's keypad, can enter at least one digit key (but not enough digit keys to form a complete telephone number) that the call management device places into a first part of a dialing string, corresponding to at least the first part of a called party's first name, without the caller first entering any information indicating that they are initiating a DBN call process. Subsequent to entering the letters (digit keys) comprising the first part of the dialing string, the caller can provide delimiter information to the call management device by entering a special key, referred to herein as a delimiter key. Entering this information can initiate an outward DBN call process. Subsequent to entering the delimiter key, the caller can enter at least one letter (digit key) in a second part of the dialing string corresponding to at least the first part of a called party's last name, and can delimit the second part of the dialing string by entering a delimiter key. The caller can then enter a fixed length third part of the dialing string comprising information corresponding to the type of phone number to be called. The dialing string is now a complete search string and the CMD 200 starts searching an electronic phone book for a contact and phone number that matches the complete search string. For example, to call Diane Jones' Mobile phone, a caller can dial 34263*56637*6 representing Diane*Jones*M (M for mobile phone) where the '*' key can be used as the delimiter. The caller can also dial abbreviated first and last names such as 342*5*6 representing Dia*J*M. In the latter case, the search may match more entries in the phone book than in the first case, but it provides a mechanism to shorten a first name that has the same or more letters than a complete phone number has digits, thus assuring that a complete phone number will not be dialed before switching into DBN mode. It also makes dialing-by-name less cumbersome. The third part of the dialing string does not need to be delimited in this case because it has a fixed length and a previous delimiter had already switched the CMD 200 into DBN mode.

Initiating a DBN call process in the manner described above does not change the way a caller initiates an outward call when the intent is to dial a phone number, and it provides an intuitive and simple way for a caller to dial-by-name and phone number type. This method also does not require that the caller remember to enter any special information prior to dialing, thus greatly reducing the possibility that a caller becomes confused and dials an unintended phone number when they think they are dialing-by-name. Provided that at least one delimiter is entered, this method can operate with a single part or a multi-part dialing string, with the string parts in any sequence. For instance, the first part of the dialing string can correspond to the phone number type, the second part of the dialing string can correspond to the last name, and the third part of the dialing string can correspond to the first name; or there can be just one part corresponding to a first name. Although the '*' key on a push button telephone's keypad is used in the above examples as the delimiter key, using the '#' key as the delimiter works equally well. On a rotary dial telephone (or on a push button phone), flashing the switch hook can be used to insert a delimiter key into the dialing string. Preferably, the first delimiter entered switches the CMD 200 into DBN mode, however, any delimiter entered can be used to initiate the DBN mode.

Figure 2:
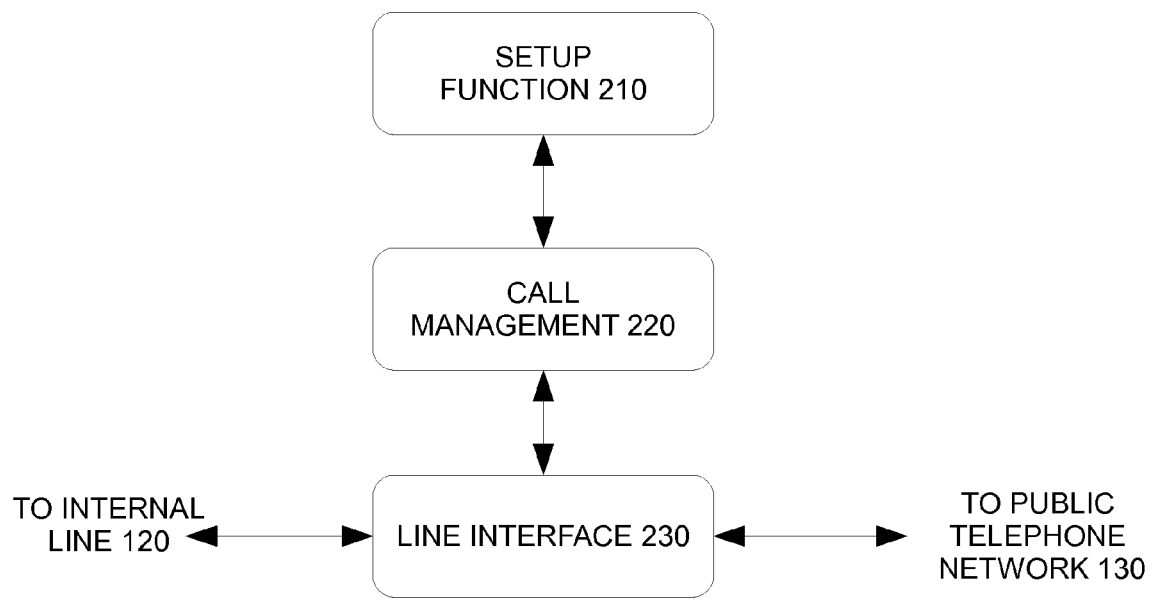
FIG. 2 is a diagram of a call management device 200.

The novel DBN dialing procedure can be implemented in an appropriate computational device, such as a Call Management Device (CMD) 200 shown in FIGS. 1 and 2. In one embodiment, the CMD 200 operates to receive outward call dialing information in a dialing string and to detect certain information in the string that it uses to complete the call in a manner intended by the caller (either DBN or dial-by-number).

FIG. 1 illustrates component parts comprising a communication network 100. The call management device (CMD) 200 is connected to a public network 130, such as a public switch telephone network, cellular or mobile network, or Internetwork generally operated to support a large number of organizations and individuals who subscribe to the services offered by a network service provider, and it is connected to a private network over an internal line 120 to one or more communication devices 140, such as a wired telephone, a cordless telephone, a fax machine, or any other type of device suitable for establishing and maintaining a communication session with a remote device over the network 130. The CMD 200 generally operates to receive information from the public network associated with an inward call and to distribute this information to the appropriate device 140, and it receives information from the private network associated with outward calls and uses this information to determine, according to an embodiment of the invention, whether the outward call is to be initiated as a DBN or a dial-by-number call. If the call is intended to be initiated according to the DBN process, the CMD 200 uses specially designed dialing logic and contact files stored in an electronic phone book to initiate the call completion process (dialing the call).

Functional elements comprising the CMD 200 will now be described in greater detail with reference to FIG. 2. The CMD 200 is comprised of a setup module 210, a call management module 220 and line interface module 230. The setup 210 generally provides a CMD user with setup and control features, the call management 220 generally provides incoming and outgoing call processing and management features, and the line interface 230 generally provides the physical interface between the call management module 220, the internal network 120, and the public network 130. Specifically, the setup 210 is employed by a user of the CMD 200 to specify dialing rules for dialing-by-number for the caller's area and to specify one or more elements comprising the contact information comprising an electronic phone book to be used when dialing-by-name. Contact information according to this description can be comprised of a first name, a last name, and one or more of a phone number(s) and a phone number type(s).

Continuing to refer to FIG. 2, the call management module 220 has functionality that assists in managing inbound and outbound calls. In general, the call management module 220 operates to detect an off hook condition on a telephone and assists in dialing a number on a public telephone network using either a dial-by-number mode or a DBN mode, and when not assisting in dialing, the call management module 220 connects incoming calls from the public telephone network to an internal line.

All of the functionality comprising the setup module 210 and the call management module 220 and the line interface module 230 can be implemented in computer software that is specially designed for the CMD 200 and which can be stored in non-volatile computer memory associated with the CMD 200.

FIG. 3 is a block diagram showing functional elements comprising the call management module 220. The call management module is comprised of a dialing string collector 221, dialing string compare logic 222, an announcer 223, an electronic phone book 224, a dialer 225, a ring detector 226 and switch logic 227. The dialing string collector 221 generally operates to collect a dialing string from a communication device 140 (FIG. 1) and to determine if that dialing string is intended to be a dial-by-number string or a DBN string. The collector 221 is comprised of an off hook detector 221A, a delimiter detector 221B and a complete phone number detector 221C. The off hook detector 221A detects when a communication device 140 (FIG. 1) is requesting a dialing operation to begin. The delimiter detector 221B determines if a delimiter has been entered into the dialing string and is used to both delimit the various parts of the dialing string and to switch the CMD 200 into a DBN mode. The complete phone number detector 221C detects when a complete phone number has been entered and no delimiter has been entered and is used to signal the CMD 200 to dial-by-number. The dialing string compare logic 222 is used to compare a complete search string to the plurality of contact information files 224A contained in the phone book 224.

The announcer 223 is used to audibly prompt the caller to take certain actions during the dialing process. The announcer 223 is comprised of prompt functionality 223A and a phone number announcer 223B. The prompt functionality 223A is comprised of the following. The dial tone prompt 223A1 is used to prompt the user to start dialing either by number or by name. The enter last name prompt 223A2 is issued in response to the caller entering the first delimiter key and prompts the user to enter part of the last name. The enter the phone number type prompt 223A3 is issued in response to the caller entering a second delimiter key and prompts the user to enter the phone number type. The no matches 223A4 and reorder tone 223A5 prompts are used to inform the user that no matches were found in the search process. And the select phone number prompt 223A6 is used to prompt the user to select one of multiple phones numbers that phone number announcer 223B announces when more than when match is found as result of the phone book search.

The dialer 225 is used to dial either the number entered in the dialing string when in dial-by-number mode or a phone number from the phone book when in DBN mode. The ring detector 226 is used to detect an incoming call from the public network 130 (FIG. 1). CMD 200 uses switch logic 227 to connect the public network 130 (FIG. 1) to the internal network using internal line 120 (FIG. 1).

The operation of the functional elements comprising the call management module 220 in FIG. 3 will now be described. The inward call operation of the CMD 200 is initiated when the ring detector 226 senses an incoming call from the public network 130 (FIG. 1) and the CMD 200 directs the switch logic 227 to connect the public network 130 (FIG. 1) to the internal line 120 (FIG. 1). The outward dialing operation of the CMD 200 is initiated when an off hook detector 221A, comprising a dialing string collector 221, detects a transition from on hook to off hook. The CMD 200 then sends a message to an announcer 223 to provide a dial tone 223A1 on the internal line 120 (FIG. 1), and the collector 221 proceeds to collect a dialing string from a telephone, such as the telephone 140 in FIG. 1. A complete phone number detector 221C comprising the dialing string collector 221 operates to detect a number dialed by a telephone, and if it detects a complete phone number (according to a set of dialing rules) in the dialing string before a delimiter detector 221B detects a delimiter, then a dialer 225 dials the collected dialing string on the public telephone network 130 (FIG. 1) and connects the public telephone network 130 (FIG. 1) to the internal line 120 (FIG. 1). The dial-by-number rules are described later with reference to FIGS. 6A and 6B. On the other hand, if the delimiter detector 221B detects a delimiter input before the complete phone # detector 221C detects a complete phone number, the call management device is switched to a DBN mode and prompts the caller, using the announcer 223, with a prompt 223A2 to enter a last name. Once a second delimiter is detected, the announcer 223 plays the enter phone number type prompt 223A3. Once the phone number type has been entered the dialing string is complete and the dialing string compare logic 222 uses the string to search for one or more matching phone numbers among the plurality of stored contact information files 224A comprising an electronic phone book 224. If the dialing string compare logic 222 does not find any matches, the announcer 223 plays the no matches prompt 223A4 and the reorder tone 223A5. Then the caller can hang up and try again.

Continuing to refer to FIG. 3, if the dialing string compare logic 222 finds only one match, the phone number announcer 223 announces the matched contact's name and phone number type, and a dialer 225 dials the associated phone number on the public telephone network 130 (FIG. 1) and then connects the internal line 120 (FIG. 1) to the public telephone network 130 (FIG. 1) using switch logic 227. If, on the other hand, the dialing string compare logic 222 finds more than one match, the announcer 223 using the phone number announcer 223B announces all the matching names and phone number types and prompts the caller using the select phone number prompt 223A6 to select one of the phone numbers using their telephone's keypad. When the caller selects the phone number they wish to call, the dialer 225 dials the selected phone number on the public telephone network 130 (FIG. 1) and connects the internal line 120 (FIG. 1) to the public telephone network 130 (FIG. 1) using switch logic 227.

Figure 4A:
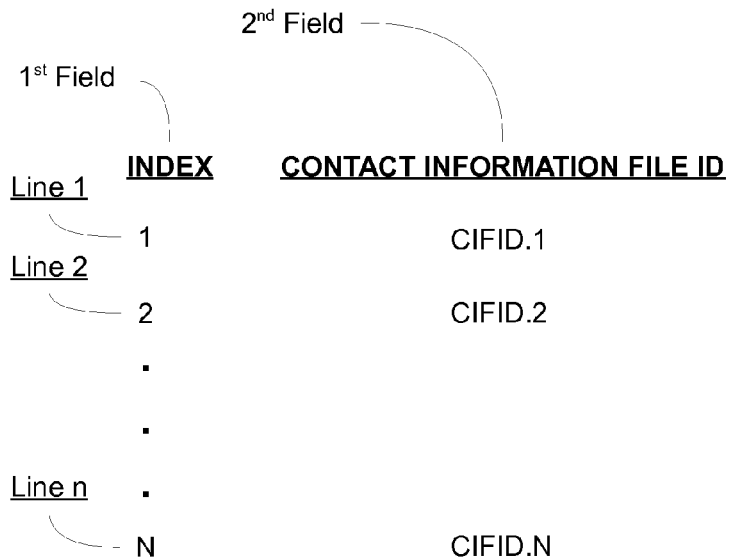
FIG. 4A is a diagram showing phone book file format 300.

FIG. 4A illustrates a format 300 in which information can be stored in an electronic phone book, such as the phone book 224 in FIG. 3. Each of at least one phone book files, such as a file 224A (FIG. 3) with a format described with reference to FIG. 4A, is comprised of a two entries or fields included in a single line of the phone book. A first field has information corresponding to an index that uniquely identifies a contact information file (CIFID) and, which in this case is simply a numerical value, and a second field has contact information corresponding to one party who can be called. Each CIFID comprising the phone book has a plurality of fields which are described below with reference to FIG. 4B.

Figure 4B:
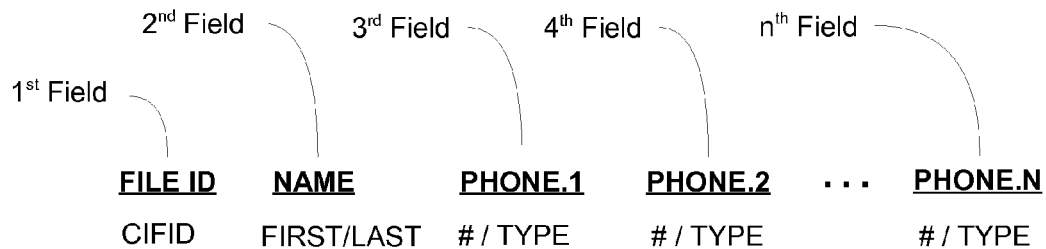
FIG. 4B is a diagram showing a contact information file format 400

FIG. 4B shows a format 400 used to store information comprising each CIFID, such as the phone book file format 300 in FIG. 4A. The CIFID shown in FIG. 4B has a first field comprising information relating to a unique file identity (File ID), and each of a second field in the plurality of the call source information files comprises information identifying the contact's name comprising a first and last name. The rest of the fields comprise the phone numbers and phone number types for the contact. As described earlier, the phone number type can be a mobile phone number, a home phone number, a work phone number, or some other designation identified by a single digit key associated with each phone number.

Figure 5A:
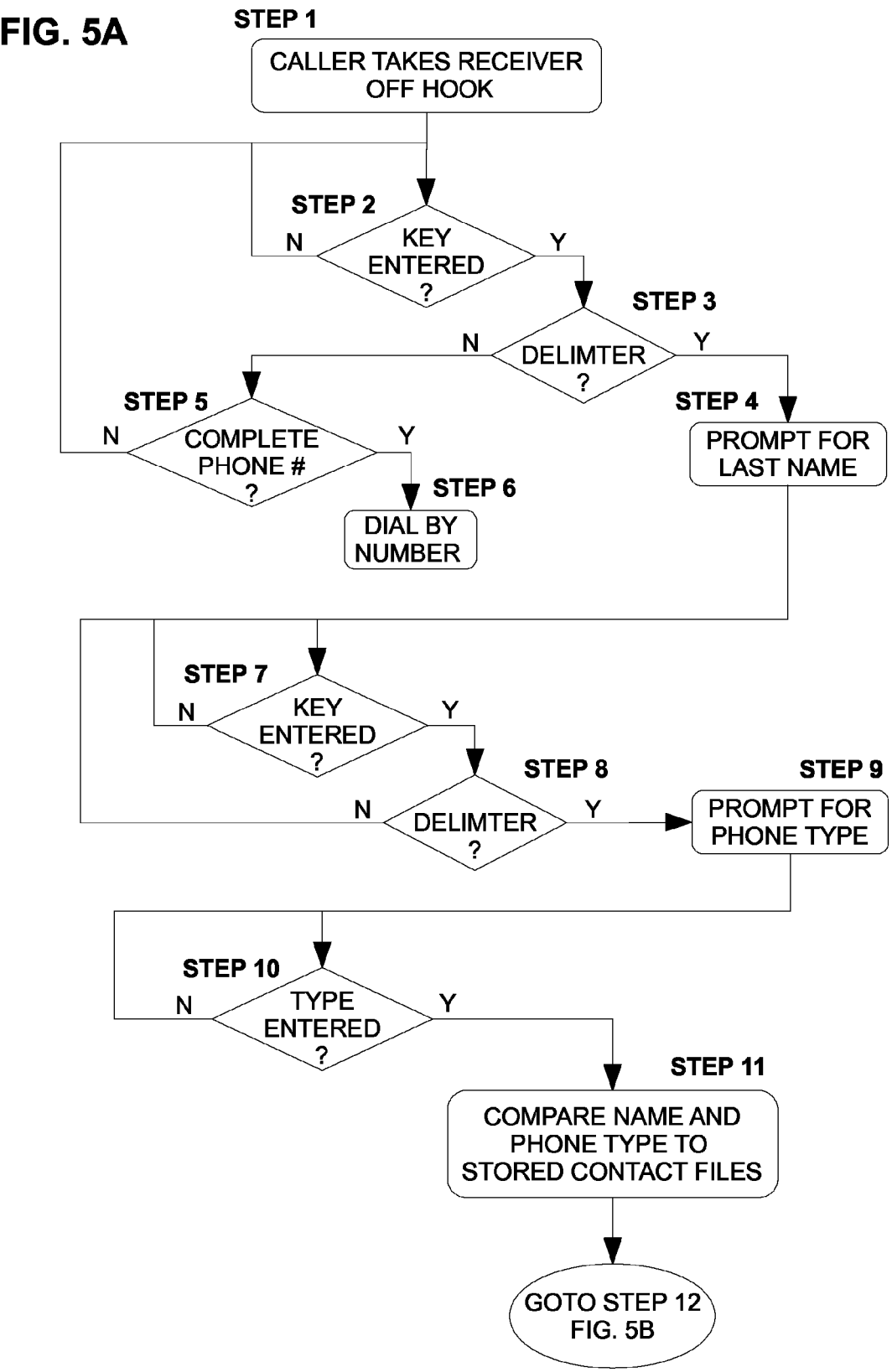
FIG. 5A is a logical flow diagram of an embodiment of the invention.

The logical process employed to implement an embodiment of the invention is described with reference to FIGS. 5A and 5B. Referring first to FIG. 5A, the CMD 200 collects a dialing string comprising information entered at a telephone by a user/caller who depresses keys on a telephone keypad. In Step 1 a caller takes the receiver of a telephone, such as the phone 140 in FIG. 1, off hook and receives a dial tone from the CMD 200. In Step 2, the CMD waits for the caller to enter a key. Each key entered at this point can represent dialing information entered with respect to either a dial-by-number process or a DBN process. As each key is entered in Step 2, it is checked in Step 3 to see if it is a delimiter key. If it is not, it is checked in Step 5 to see if the dialing information entered constitutes a complete phone number. If the dialing string is a complete phone number, then in Step 6 the dialing string is used to dial the phone number. If, in Step 5, the collected dialing string is not a complete phone number, the CMD 200 returns to Step 2 and waits for another key.

Returning to Step 3, if a delimiter key is detected, then in Step 4 the CMD 200 prompts the caller to enter a last name and then waits in Step 7 for the caller to enter another key. As each key is entered it is checked in Step 8 to see if it is a delimiter key. If so, the CMD 200 prompts the caller for the phone number type in step 9 and waits for the caller to enter a key to denote the phone number type in Step 10.

Continuing to refer to FIG. 5A, once the phone number type is detected in Step 10, the dialing string is now a complete search string, and in Step 11 information in the search string is compared to information stored in the electronic phone book 224. The first and last name strings are compared with the first M characters of the contact's first name and N characters of the contact's last name where M & N are the number of digit keys in the first and last name strings respectively. Any non-letter characters in the contact's first or last name are ignored in the comparison. A letter in the contact's name is considered equal to the corresponding digit key in the complete search string if the letter matches any of the three or four letters associated with the corresponding digit key.

Figure 5B:
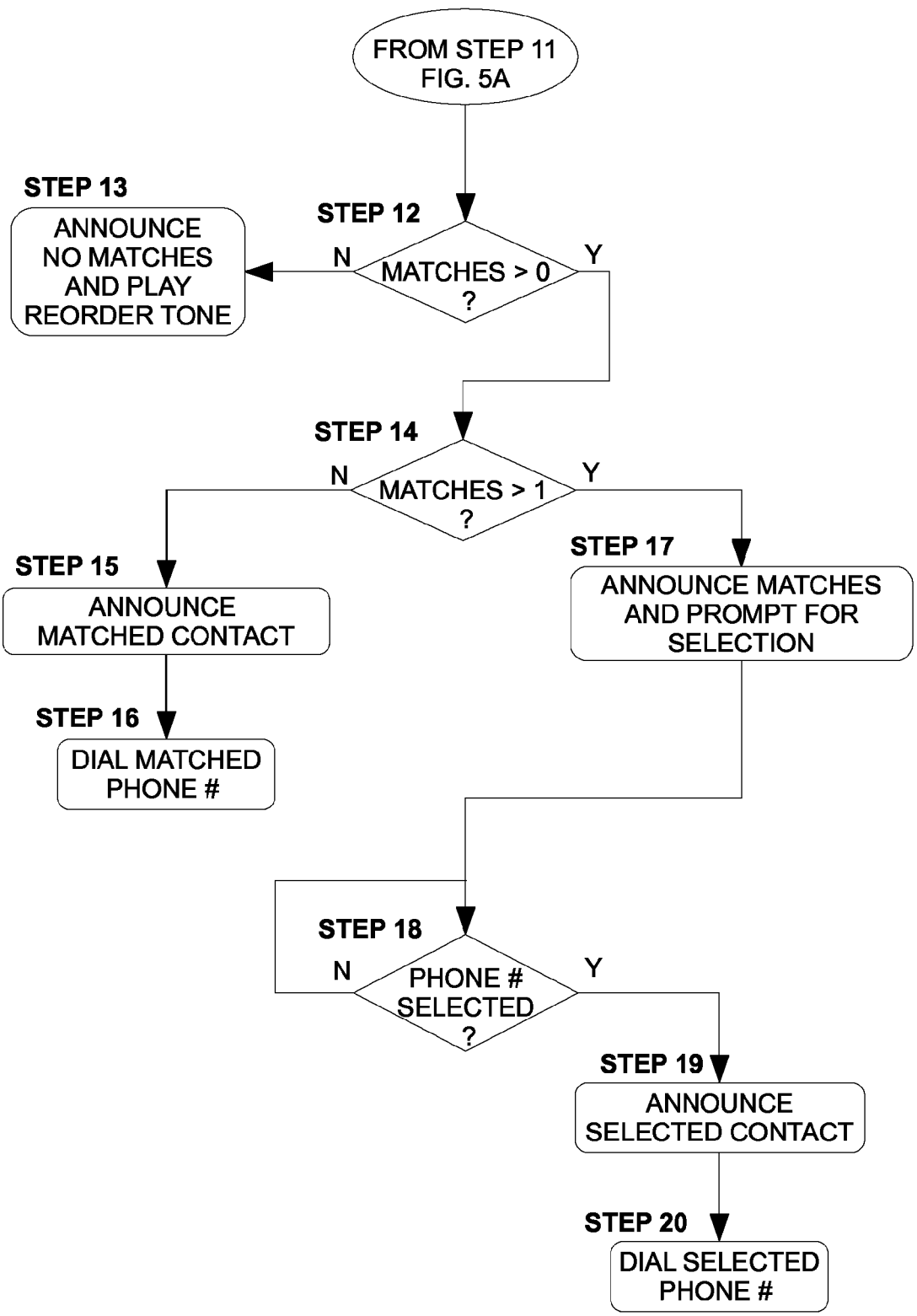
FIG. 5B is a continuation of the logical flow diagram of FIG. 5A.

Referring now to FIG. 5B, in Step 12, if the result of the comparison in Step 11 yields no matches, then in Step 13 the CMD 200 announces that result and plays a reorder tone. The caller can then hang up and try again. If the result of the comparison in Step 11 yields one or more matches, the process proceeds to Step 14 where it is determined that either there is only one match or there is more than one match. If it is determined in Step 14 that there is only one match, then the process proceeds to Step 15 and the CMD 200 announces the matched contact's name and phone number type using the phone number announcer and, in Step 16 the system dials the matched phone number on the public telephone network and connects the internal line 120 to the public telephone network 130 using switch logic 227. On the other hand, if in Step 14 there is more than one match, the process proceeds to Step 17, and the CMD 200 announces all the matched contacts and phone number types using the phone number announcer and prompts the caller to select one of them. In Step 18, the CMD 200 waits for the caller to select one of the phone numbers. Once selected, in Step 19 the CMD 200 announces the selected contact's name and phone number type using the phone number announcer, and in Step 20 dials the selected phone number and then connects the internal line 120 to the public telephone network.

As described above with reference to FIG. 5A, by appending a single key, entered after the second string delimiter key, a particular phone number type of the matched contact can be selected. This allows the dialing string, with the addition of a single key entry, to specify both the contact's name and the type of phone to call for that contact (home, mobile, work, etc.). To make it easier for the caller, the letters associated with the digit keys can be used to identify the phone number type; for example, 2 (aBc) for a business phone number, 3 (deF) for facsimile machine phone number, 4 (gHi) for a home phone number, 6 (Mno) for a mobile phone number, and 9 (Wxyz) for a work phone number.

The CMD 200 can be aware of a set of dial-by-number rules so that it knows when a complete dial-by-number dialing string has been entered. If the dialing rules are simple enough, they can be preset in the CMD 200 non-volatile memory. Otherwise, if the call management device is located in a telephone company's central office it can get the dialing rules from the central office's equipment, or if in a VOIP or wireless device it can get the dialing rules from the VOIP or wireless provider. Otherwise, the call management device will need to provide a way for the user to set up the dialing rules.

Once the dialing rules have been created and an electronic phone book created, this method of dialing-by-name can be employed with either a push button telephone or a rotary dial telephone in an intuitive and convenient way with no adverse side effects and without changing the way a phone number is dialed.

Figure 6A:
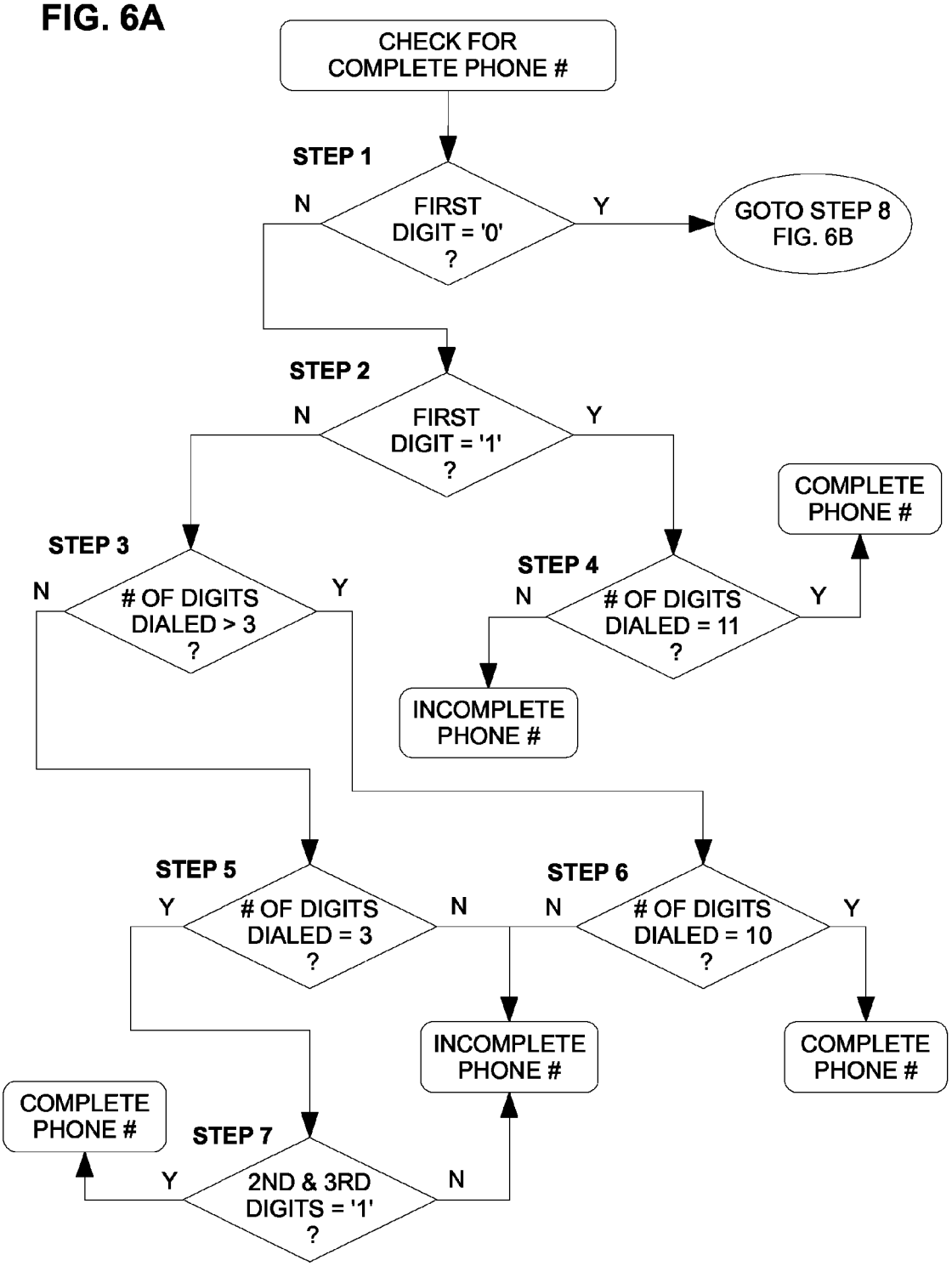
FIG. 6A is a logical flow diagram of an example set of dial-by-number rules
Figure 6B:
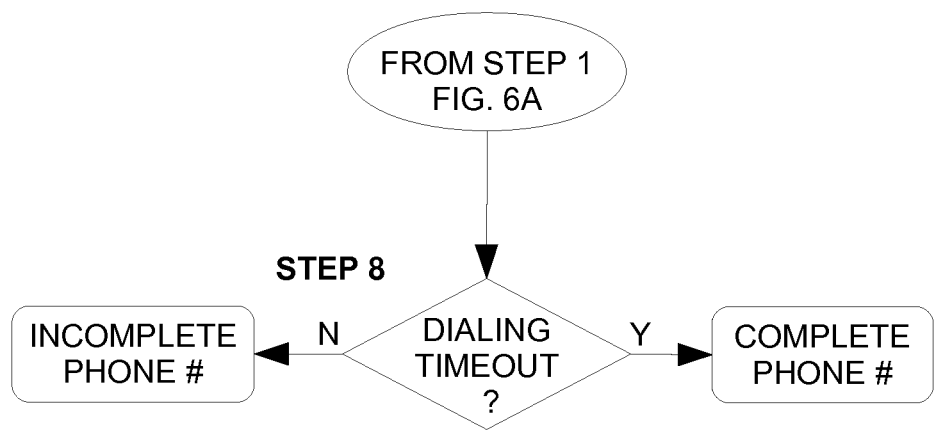
FIG. 6B is a continuation of the logical flow diagram of FIG. 6A.

FIGS. 6A and 6B illustrate an example set of dialing-by-number rules used to check a dialing string for a complete phone number. In Step 1, if the first digit of the dialing string is the 0 digit, then in Step 8 if five seconds have elapsed since the last digit was dialed, the phone number is considered complete; otherwise the phone number is incomplete. Returning to Step 1, if the first digit is not the 0 digit, then in Step 2 if the first digit is the 1 digit and in Step 4 the number of digits dialed is eleven, the phone number is complete; otherwise the phone number is incomplete. If in Step 2, the first digit is not the 1 digit, then in Step 3 if the number of digits dialed is greater than three and in Step 6 the number of digits dialed is ten, then the phone number is compete; otherwise the phone number is incomplete. If in Step 3 the number of digits is three or less, than in Step 5 if the number of digits is three and in Step 7 the second and third digits are the digit 1, then the phone number is complete; otherwise the phone number is incomplete. If in Step 5 the number of digits is not three, the phone number is incomplete.

The first embodiment illustrated above with reference to FIGS. 5A and 5B does not require that complete first and last names be entered for the CMD 200 to operate to identify a unique CIFID. In this regard, not all of the characters in the first name and last name of a phone book contact need be used in the comparison with first and second name strings in order to uniquely match a contact's name in the phone book. In most cases, a first name string containing only three digit keys and a second name string containing only two digit keys when compared against the corresponding letters of a contact's the first and last name will uniquely identify a contact in a phone book that has a thousand contacts. In cases where more than one matching phone number is found, the call management device announces the matching contacts and phone number types and prompts the user to select the one they wish to call.

In another embodiment, if the caller does not know or does not want to specify the last name and/or phone number type, the caller can enter the delimiter key instead of the last name and/or the phone number type and the dialing string compare logic 222 will bypass matching for that part of the search string. For example, if the caller did not know the last name or phone type of John Smith, they can enter John* (5646*) and the CMD 200 will find all contacts with a first name starting letters associated with the digit keys 5646 and with any last name and any phone type. Other than the ability to skip the comparison of the last name and/or phone type, this embodiment will work like the first embodiment illustrated above.

In another embodiment, if the caller enters less than a complete dialing string and at least one delimiter, after a time out period the CMD 200 can determine that the dialing string is complete and can then start searching the phone book using only the entered information. Other than the ability to use a timeout to skip the comparison of the second and third parts of the dialing strings or to skip just the third part of the dialing string, this embodiment will work like the first embodiment illustrated above.

In another embodiment of the invention, the caller can enter only a two part dialing string corresponding to a first and last name. For example, to call one of John Smith's phone numbers, the caller can enter Joh*Smi* (564*764*) and the CMD 200 will find all contacts whose first name started with letters associated with the digits 564 and whose last name started with letters associated with the digits keys 764. Other than the lack of phone number type specification, this embodiment will work like the first embodiment illustrated above.

In another embodiment of the invention, a middle name can be added between the first and last name with delimiters separating the middle name from the first and last names. For example, to call John Quincy Adams' home phone, a caller can enter Jo*Qu*Ad*H (56*78*23*4). The first '*' can delimit the first name from the middle name and switch the CMD 200 into DBN mode and the middle name will be used in the matching process along with the first name, last name, and phone number type. Other than addition of the middle name, this embodiment will function like the first embodiment illustrated above.

In another embodiment of the invention, the order of the first name, last name, and phone number type can be changed so that the phone type can be entered first, then the first name, then the last name. For instance, to call the mobile phone for John Adams, a caller can enter M*John*Ad*. The CMD 200 will then obtain the phone number type, first name, and the last name from the appropriate parts of the dialing string, and the rest of the process will be the same as the first embodiment. As with the first embodiment, the first '*' can be used both to delimit the first part of the dialing string from the second part and to switch the CMD 200 into DBN mode.

In another embodiment of the invention, only one delimiter can be entered into the CMD 200 to separate the name from the phone number type. The '*' can be used to both delimit the name from the phone number type and to switch the CMD 200 into a DBN mode. In this case, the CMD 200 will split the name entry into various first and last name pairs and then compare each of the variations to the first and last name of the contacts in the phone book. For instance, a caller who wants to call Diane Jones' mobile phone can enter (3456*6) to represent the entry DiJo*M, and the CMD 200 will match the contact Diane Jones who has a mobile phone number. It will also match any contact who has a mobile phone number and whose last name starts with letters associated with digits 3456 (for instance John Filo); and it will match any contact whose first name starts with letters associated with the digit 3 and whose last name starts with letters associated with digits 456 (for instance Frank Globe); and it will match any contact whose first name starts with letters associated with digits 34 and whose last name starts with letters associated with digits 56 (for instance Filo Montana); and it will match any contact whose first name starts with letters associated with digits 345 and whose last name starts with letters associated with the digit 6 (for instance Filo Oscar); and it will match any contact whose first name starts with letters associated with digits 3456 (for instance Filo Jones). As with the first embodiment, if more than one contact is matched, the CMD 200 will announce all matched contacts and phone number types and ask the caller to choose the one they want to call. Other ways to split the name into first and last name pairs can be devised without changing the fundamental way the CMD 200 switches from dial-by-number mode to DBN mode. Other than the splitting of the name into various first and last names for comparison purposes, this embodiment will work like the first embodiment illustrated above.

In another embodiment of the invention, the name and phone number type can be entered as one string with one delimiter at the end of the string, in which case the CMD 200 will strip the phone number type from the end of the string and split the rest of the string as described above. For instance, if a caller wants to call Diane Jones' mobile phone, they can enter (34566*) to represent the entry DiJoM*. The 'M' will be used for the phone number type and "DiJo" will be split into the various first and last name pairs.

As with the first embodiment, the '*' key on a push button telephone's keypad can be used as the delimiter key as illustrated above in the alternative embodiments. However, using the '#' key as the delimiter works equally well. On a rotary dial telephone (or on a push button phone), flashing the switch hook can be used to insert a delimiter key into the dialing string.

The forgoing description, for purposes of explanation, used specific nomenclature to provide a thorough understanding of the invention. However, it will be apparent to one skilled in the art that specific details are not required in order to practice the invention. Thus, the forgoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications; they thereby enable others skilled in the art to best utilize the invention and embodiments with various modifications as are suited to the particular use contemplated. It is intended that the following claims and their equivalents define the scope of the invention.

We claim:

1. A method for placing a telephone call, comprising:

compiling and storing a plurality of contact information files and a set of one or more dialing rules in a non-volatile memory associated with a communication device operative to place the telephone call on a public telephone network, each one of the plurality of the contact information files comprising name information and at least one phone number;

receiving a dialing string comprised of a plurality of dialed keys entered into the communication device until the dialing string forms a complete phone number or includes a delimiter without receiving any information prior to entry of the dialing string indicating that the dialing string corresponds to a dial-by-name process;

if the dialing string contains a number of digits corresponding to a complete phone number without a delimiter, processing the dialing string as a dial-by-number entry by placing the telephone call on the public telephone network using the dialing string; and if the dialing string includes a delimiter prior to receipt of the number of digits corresponding to a complete phone number, processing the dialing string as a dial-by-name entry by identifying a corresponding contact information file having name information corresponding to the dialing string up to the delimiter, and placing the telephone call on the public telephone network using the phone number stored as part of the corresponding contact information file.

2. The method of claim 1, when the dialing string includes a delimiter, and wherein the delimiter is a first delimiter, further comprising:
receiving a first name abbreviation in the dialing string up to the first delimiter;
receiving a second name abbreviation in the dialing string up to a second delimiter;
identifying the corresponding contact information file by comparing the first name abbreviation to a first name stored as part of the corresponding contact information file, and comparing the second name abbreviation to a second name stored as part of the corresponding contact information file.

3. The method of claim 1, wherein the delimiter is associated with the '*' key or the '#' key on a 12 button telephone keypad of the communication device or flashing of a switch hook.

4. A method for placing a telephone call, comprising:
compiling and storing a plurality of contact information files and a set of one or more dialing rules in a non-volatile memory associated with a communication device operative to place the telephone call on a public telephone network, each one of the plurality of the contact information files comprising name information and at least one phone number;
receiving a dialing string comprised of a plurality of dialed keys entered into the communication device until the dialing string forms a complete phone number or includes a delimiter without receiving any information prior to entry of the dialing string indicating that the dialing string corresponds to a dial-by-name process;
if the dialing string contains a number of digits corresponding to a complete phone number without a delimiter, processing the dialing string as a dial-by-number entry by placing the telephone call on the public telephone network using the dialing string;
if the dialing string includes a delimiter prior to receipt of the number of digits corresponding to a complete phone number, processing the dialing string as a dial-by-name entry by:
identifying a plurality of contact information files having name information corresponding to the dialing string up to the delimiter,
announcing one or more names stored as parts of the identified contact information files along with one or more selection prompts;
receiving an indication of a selected contact information file, and
placing the telephone call on the public telephone network using the phone number stored as part of the selected contact information file.

5. The method in claim 4, wherein the indication of the selected contact information file comprises a user entry received through a keypad or microphone of the communication device.

6. The method of claim 4, when the dialing string includes a delimiter, and wherein the delimiter is a first delimiter, further comprising:
receiving a first name abbreviation in the dialing string up to the first delimiter;
receiving a second name abbreviation in the dialing string up to a second delimiter;
identifying a corresponding contact information file by comparing the first name abbreviation to a first name stored as part of the corresponding contact information file, and comparing the second name abbreviation to a second name stored as part of the corresponding contact information file.

7. The method of claim 4, wherein the delimiter is associated with the '*' key or the '#' key on a 12 button telephone keypad of the communication device or flashing of a switch hook.

8. The method of claim 1, wherein the dial-by-number entry consists of dialed digits that correspond to a complete phone number as described in a set of dialing rules stored in the non-volatile memory.

9. The method of claim 1, wherein the dial-by-number entry consists of eleven dialed digits and a first dialed digit that is a one, or ten dialed digits and a first dialed digit that is not a one.

10. The method of claim 1, wherein the delimiter is a first delimiter, and the dial-by-name entry comprises first name information followed by the first delimiter and second name information followed by a second delimiter.

11. The method of claim 1, wherein the corresponding contact information file further comprises a plurality of phone numbers, each associated with a telephone number type, and the dial-by-name entry comprises an indicator of a selected telephone number type.

12. The method of claim 11, wherein the delimiter is a first delimiter, and the dial-by-name entry comprises first name information followed by the first delimiter, second name information followed by a second delimiter, and the indicator of the selected telephone number type.

13. The method of claim 4, wherein the dial-by-number entry consists of dialed digits that correspond to a complete phone number as described in a set of dialing rules stored in the non-volatile memory.

14. The method of claim 4, wherein the dial-by-number entry consists of eleven dialed digits and a first dialed digit that is a one, or ten dialed digits and a first dialed digit that is not a one.

15. The method of claim 4, wherein the delimiter is a first delimiter, and the dial-by-name entry comprises first name information followed by the first delimiter and second name information followed by a second delimiter.

16. The method of claim 4, wherein the selected contact information file further comprises a plurality of phone numbers, each associated with a telephone number type, and the dial-by-name entry comprises an indicator of a selected telephone number type.

17. The method of claim 16, wherein the delimiter is a first delimiter, and the dial-by-name entry comprises first name information followed by the first delimiter, second name information followed by a second delimiter, and the indicator of the selected telephone number type.

18. A method for placing a telephone call, comprising:
compiling and storing a plurality of contact information files and a set of one or more dialing rules in a non-volatile memory associated with a communication device operative to place the telephone call on a public telephone network, each one of the plurality of the contact information files comprising name information and at least one phone number;
receiving a dialing string comprised of a plurality of dialed keys entered into the communication device until the dialing string forms a complete phone number or includes a delimiter;

if the dialing string contains a number of digits corresponding to a complete phone number without a delimiter, processing the dialing string as a dial-by-number entry by placing the telephone call on the public telephone network using the dialing string;

if the dialing string includes an initial delimiter prior to receipt of the number of digits corresponding to a complete phone number without receiving any information prior to entry of the dialing string indicating that the dialing string corresponds to a dial-by-name process, processing the dialing string up to the initial delimiter as a dial-by-name entry by identifying a corresponding contact information file having name information corresponding to the dialing string up to the delimiter, and placing the telephone call on the public telephone network using the phone number stored as part of the corresponding contact information file.

19. The method of claim 18, when the dialing string includes an initial delimiter, further comprising:

receiving a first name abbreviation in the dialing string up to the initial delimiter;

receiving a second name abbreviation in the dialing string up to a second delimiter;

identifying the corresponding contact information file by comparing the first name abbreviation to a first name stored as part of the corresponding contact information file, and comparing the second name abbreviation to a second name stored as part of the corresponding contact information file.

20. The method of claim 18, wherein the initial delimiter is associated with the '*' key or the '#' key on a 12 button telephone keypad of the communication device or flashing of a switch hook.

* * * * *